US012558724B2

(12) United States Patent
    Cui et al.

(10) Patent No.: US 12,558,724 B2
(45) Date of Patent:        Feb. 24, 2026

(54) NEAR NET SHAPE FABRICATION OF ANISOTROPIC MAGNET USING HOT ROLL METHOD

(71) Applicant: Iowa State University Research Foundation, Inc., Ames, IA (US)

(72) Inventors: Jun Cui, Ames, IA (US); Ryan T. Ott, Ames, IA (US); Wei Tang, Ames, IA (US); Xubo Liu, Ames, IA (US); Cajetan Ikenna Nlebedim, Ames, IA (US); Gaoyuan Ouyang, Ames, IA (US); Chaochao Pan, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 17/803,385

(22) Filed: Jun. 13, 2022

(65) Prior Publication Data

US 2023/0405673 A1      Dec. 21, 2023

Related U.S. Application Data

(60) Provisional application No. 63/259,052, filed on Jun. 16, 2021.

(51) Int. Cl.
    B22F 7/04           (2006.01)
    B22F 3/18           (2006.01)
                            (Continued)

(52) U.S. Cl.
    CPC .................. B22F 7/04 (2013.01); B22F 3/18 (2013.01); B22F 3/24 (2013.01); B22F 5/10 (2013.01);
                            (Continued)

(58) Field of Classification Search
    None
    See application file for complete search history.

(56) References Cited

U.S. PATENT DOCUMENTS 4,921,551 A * 5/1990 Vernia ................ B65D 75/5877
                                                        148/120
2014/0291296 A1   10/2014 Jin et al.
                            (Continued)

FOREIGN PATENT DOCUMENTS

JP         H1 248503 A      10/1989
JP         02102504 A  *  4/1990  ........... H01F 1/0576
                            (Continued)

OTHER PUBLICATIONS

Machine translation of JP09-237730A. (Year: 1997).*
                            (Continued)

*Primary Examiner* — Xiaowei Su

(57)                    ABSTRACT

A method for fabrication of an anisotropic magnet comprises placing magnet alloy feedstock particles in a deformable metallic container and thermomechanically working the filled container in a manner to elongate the filled container and reduce its cross-sectional area to consolidate the magnet alloy particles to an elongated shape and impart a preferential grain texture to the consolidated, elongated shape. The consolidated, elongated shape is machined to a near-final magnet shape that has a smaller dimension such as magnet length and that includes a metallic tubular skin thereon.

19 Claims, 5 Drawing Sheets

(51) Int. Cl.

| | |
|---|---|
| *B22F 3/24* | (2006.01) |
| *B22F 5/10* | (2006.01) |
| *B32B 15/01* | (2006.01) |
| *H01F 41/02* | (2006.01) |

(52) U.S. Cl.
CPC ....... *B32B 15/013* (2013.01); *H01F 41/0253* (2013.01); *B22F 2003/185* (2013.01); *B22F 2003/247* (2013.01); *B22F 2007/042* (2013.01); *B22F 2301/355* (2013.01); *B22F 2998/10* (2013.01); *B32B 2307/208* (2013.01)

(56) References Cited

U.S. PATENT DOCUMENTS

| | | | |
|---|---|---|---|
| 2016/0055969 A1 | 2/2016 | Haga et al. | |
| 2017/0187258 A1 | 6/2017 | Fujikawa et al. | |
| 2019/0115126 A1 | 4/2019 | Cui et al. | |
| 2019/0122281 A1 | 4/2019 | Liang et al. | |
| 2019/0122818 A1* | 4/2019 | Meinke | B22F 3/12 |
| 2021/0062310 A1* | 3/2021 | Chen | C22C 38/005 |
| 2021/0210996 A1 | 7/2021 | Eguchi et al. | |

FOREIGN PATENT DOCUMENTS

| | | | | | |
|---|---|---|---|---|---|
| JP | 05152113 A | * | 6/1993 | ........... | H01F 1/0571 |
| JP | H05135923 A | * | 6/1993 | ........... | H01F 1/0576 |
| JP | 09237730 A | * | 9/1997 | ........... | H01F 1/0576 |
| JP | 2017-050396 | | 3/2017 | | |
| JP | 2018-522400 | | 8/2018 | | |
| SU | 1622082 A1 | * | 9/1988 | ........... | H01F 1/0576 |
| WO | WO 2016/183824 | | 11/2016 | | |
| WO | WO 20200075470 A1 | | 4/2020 | | |

OTHER PUBLICATIONS

Machine translation of JP02-102504A. (Year: 1990).*
Machine translation of SU 1622082A1. (Year: 1988).*
Machine translation of JP05-152113A. (Year: 1993).*
Machine translation of JPH05-135923A. (Year: 1993).*
Arnold Magnetic Technologies, Neodymium Iron Boron Magnets 2023.
Horton, J.A. et al, Fracture toughness of commercial magnets, IEEE Transactions on Magnetics, vol. 32, No. 5, Sep. 1996.
Li, Wei et al, Anisotropic Fracture Behavior of Sintered Rare-Earth Permanent Magnets, IEEE Transactions on Magnetics, vol. 41, No. 8, Aug. 2005.
Li, W. F. et al, The origin of coercivity in fined-grained Nd—Fe—B sintered magnets, Journal of Magnetism and Magnetic Materials, 321, 2009.
Sephri-Amin, H. et al, Microstructure of fine-grained Nd—Fe—B sintered magnets with high coercivity, Scripta Materials, 65, 2011.
Liu, J.F. et al, Microstructure and magnetic properties of sintered NdFeB magnets with improved impact toughness, Magnetism and Magnetic Materials, Journal of Applied Physics, 97 10H101, 2005.
Magnequench International, Bonded Neo Powder, 2023 (https://mqitechnology.com/products/bonded-neo-powder).
Knoch, K. et al, Nd2Fe14B—Its Region of Primary Solidification Z. Metallkd., 85, 5, 1994.
Croat, John J., Current Status of Rapidly Solidified Nd—Fe—B Permanent Magnets, IEEE Transactions, vol. 25, No. 5, Sep. 1989.
Grunberger, W. et al, Hot deformation of nanocrystlline Nd—Fe—B alloys, Journal of Alloys and Compounds, 257, 1997.
Liu, J. et al, Microstructure evolution of hot-deformed Nd—Fe—B anisotropic magnets, Journal of Applied Physics 115, 17A744, 2014.
Hioki, Keiko, High performance hot-deformed Nd—Fe—B magnets, Science and Technology of Advanced Materials, vol. 22, No. 1, 2021.

* cited by examiner

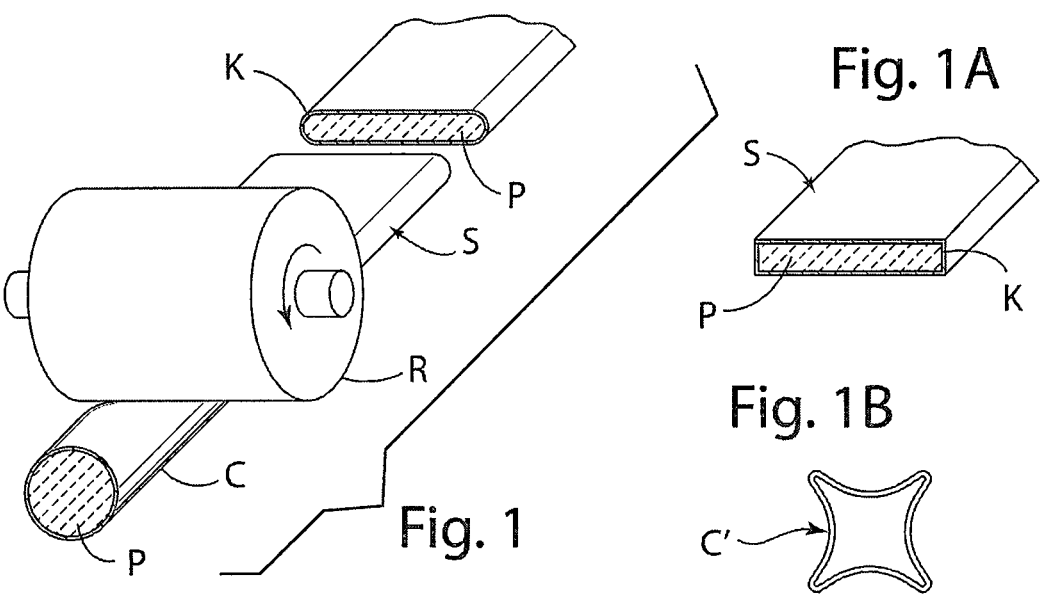
Fig. 1A
Fig. 1B
Fig. 1
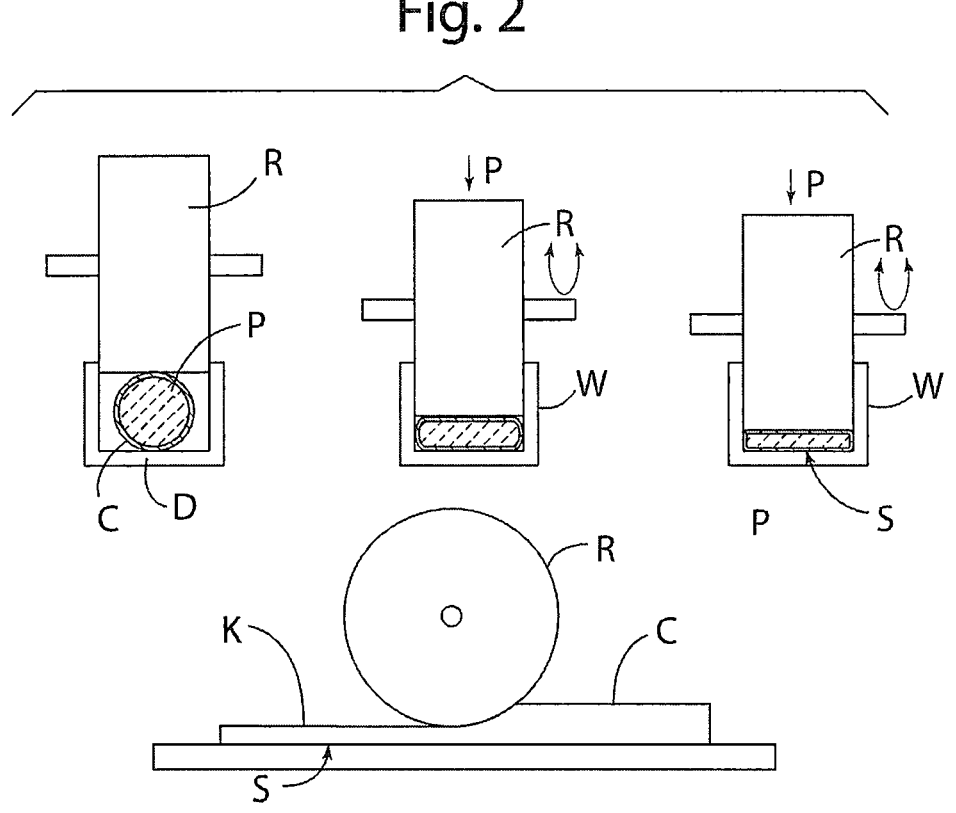
Fig. 2

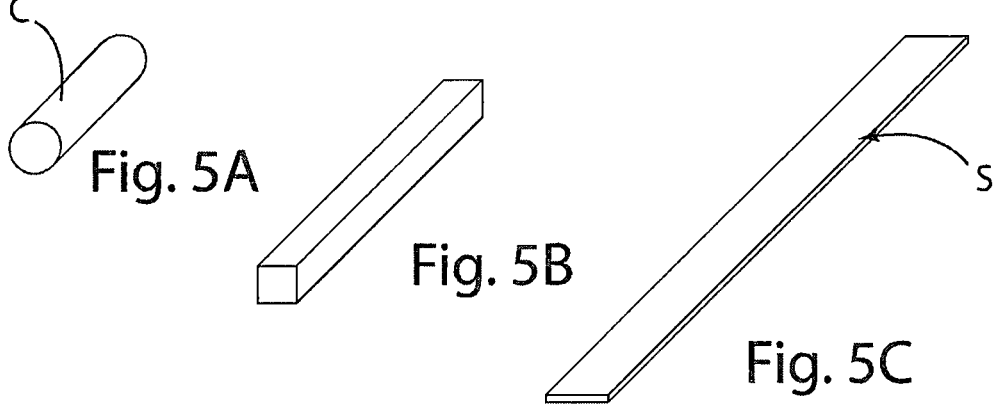
Fig. 5A
Fig. 5B
Fig. 5C
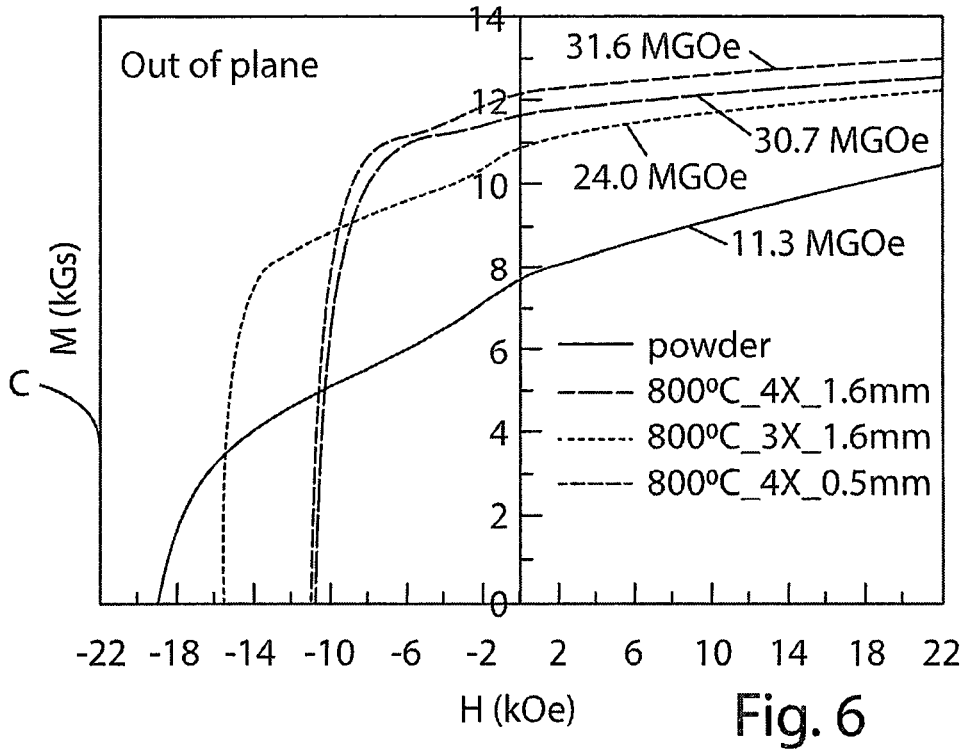
Fig. 6

NEAR NET SHAPE FABRICATION OF ANISOTROPIC MAGNET USING HOT ROLL METHOD

CONTRACTUAL ORIGIN OF THE INVENTION

This invention was made with government support under Grant No. DE-AC-02-07CH11358 awarded by the U.S. Department of Energy. The government has certain rights in the invention.

FIELD OF THE INVENTION

The present invention relates to a method of making an anisotropic permanent magnet and the magnet produced by the method. More particularly, this invention relates to making permanent magnets using hot rolling, hot extruding or other suitable thermo-mechanical process.

BACKGROUND OF THE INVENTION

Nd—Fe—B "Neo" based permanent magnets are the preferred magnet for energy efficiency and renewable energy applications due to their high energy density. The most powerful commercial Neo magnet can reach 55 MGOe (440 kJ/m$^3$) at room temperature. However, magnets are sensitive to temperature. Both magnetization (density of the magnetic dipole moments) and coercivity (ability to resist demagnetization field) decrease with increasing temperature, but coercivity decreases about 4-5 times faster than magnetization. For a magnet to operate at a high temperature, it needs to have excessive coercivity at room temperature so that there is enough coercivity remaining when reaching the operating temperature. For example, the Neo magnet graded for 120° C. operation (N45UH) has an intrinsic coercivity 25.2 kOe at 20° C., which reduces to 12.2 kOe at 120° C. Such high coercivity was achieved by increasing magnetocrystalline anisotropy via partial substitution of Dy for Nd. However, Dy couples with Nd and Fe in an antiferromagnetic order which may reduce Neo's magnetization by 10% for extensive use of Dy.

The coercivity of a magnet is sensitive to its grain size. It increases with decreasing grain size until the grain sizes reach a critical size that is comparable to the field exchange coupling length, then it starts to decrease. In the case of Neo magnet, this critical exchange coupling length is about 100 nm. This relationship implies that coercivity can be enhance by refining the grain size in a magnet. The fine-grain approach promises to improve coercivity without sacrificing magnetization, but the method of sintering fine-grain magnet is unfeasible due to the fundamental conflict between the preferred higher temperature needed for sintering and the preferred lower temperature for preventing grain from growing.

The major phase in the Neo magnet is the Nd$_2$Fe$_{14}$B intermetallic compounds. It has a primitive tetragonal unit cell containing 68 atoms. It is intrinsically brittle due to their mixed metallic-covalent bonding and limited slip systems for dislocations to glide in. Manufacturing defects such as non-uniform microstructures and residual stress further reduce their ability to resist crack nucleation and propagation. Fracture toughness of commercial Neo magnet is about 3.9-5.5 MPa√m̄. It is only somewhat better than the Corning Gorilla display glass (0.7 MPa√m̄). Even with extra caution, manufacturers often see >20% of failure rate when machining parts with high aspect ratio. With the size of the magnets approaching the millimeter scale, the high machining failure rate becomes more profound. While a lot of failed material can be reused as feedstock, there is a significant amount that cannot. Moreover, there is a large increase in embodied energy when these have to be recycled. In addition to the poor mechanical properties, the small magnet also suffers from inconsistent magnetic properties from part to part, partly caused by the temperature gradient in large sintering block during heat treatment.

Decreasing the grain size of the Nd$_2$Fe$_{14}$B phase has been considered as the most effective methods to increase the coercivity of Nd—Fe—B sintered magnets. However, for the sintered magnet, there is a critical grain size of about 2.7 μm, below which the coercivity does not increase further but decreases. Such behavior is attributed to the oxidation with decreasing powder sizes. Further control of oxidization for the finely milled powders appears to be economically unfeasible. This critical grain size is much larger than the previously mentioned exchange coupling length, implying much room to improve for the fine grain magnet approach.

Improving Neo's mechanical properties without noticeable compromise to magnetic properties has been demonstrated through microstructure engineering. Addition of Al, Ga, Cu, Nb forms ductile intergranular phases and fine precipitates within the grain, both help to slow down crack propagation. As high as 69% improvement in impact toughness was achieved with this approach. Coincidentally, fine-grain approach may also be effective to improve mechanical strength. Recent results by a group at Ames Laboratory showed that the improvement in mechanical strength and fracture toughness can be explained by the Hall-Patch relation. The fine-grain approach is more attractive because most manufacturers are reluctant to change chemistry, especially when more expensive elements such as Ga and Nb are involved. However, this approach requires enough non-magnetic Nd-rich phase to be distributed on grain boundaries, so that grains are magnetically separated to ensure high coercivity.

Near-net-shape fabrication of small magnets via the sintering route is difficult as the green compacts can lose up to 25% in volume through shrinkage during the sintering treatment. However, net-shape may be realized through additive manufacturing, injection-molding, and hot-deformation. Currently, additive manufacturing is not optimum for making a fully dense anisotropic Neo magnet because the sizeable hot zone associated with the laser and e-beam powder melting process makes it challenging to control grain size, texture, and grain boundary phases. It is possible to use a micron-size laser to process sub-micron feedstock powder additively, but the challenge in controlling oxidization for fine powders while maintaining reasonable productivity makes the additive approach unfeasible in the near term. Bonded magnets possess a high degree of net-shape formability as such materials can be processed at relatively low temperatures (170-300° C.) depending on the binder and molding technique being used. The obtained bonded magnet exhibits excellent fracture toughness. However, these significant improvements come at a high cost to magnetic properties due to the addition of binder materials and the isotropic nature of the composite. The best commercial bonded neo magnet can offer only 16 MGOe at room temperature.

Hot-pressed nanocrystalline magnets can achieve a high level of net shape. It is the most straightforward method for producing fully dense, high-energy product net-shaped magnets. The process starts with nano-grained powder produced by melt spinning, then hot pressing for densification without grain growth. This densification is possible in the temperature range from 700 to 750° C. because a liquid grain-boundary phase is present above 670° C. A subsequent hot deformation produces grain alignment along the c-axis by plastic flow at 700-800° C. For instance, die-upsetting of the hot-pressed precursors results in anisotropic magnets with a c-axis alignment parallel to the press direction. Another example is the production of radially oriented ring magnets by backward extrusion. The drawbacks are the additional cost of two steps batch process and limited part size/shape.

SUMMARY OF THE INVENTION

Certain embodiments of the present invention provide a method for near-net-shape fabrication of high-performance anisotropic permanent magnet with improved consistency in magnetic properties and reduced part failure rate during machining and assembly. Practice of the present invention can be used to make RE-TM, RE-TM-B, RE-TM-N, TM-N, Mn—(Bi, Al, Ga) based magnets, where RE can be a single rare earth element including Y, La, Ce, Nd, Pr, Sm, Gd, Tb, Dy or a combination of two or more of them; and TM is a single transition metal including Ti, V, Cr, Mn, Fe, Co, Ni, Cu, Zn, Zr, Nb, Mo or a combination of two or more of them.

A certain embodiment of the present invention involves filling magnet alloy feedstock particles in a deformable (ductile) metallic container, thermomechanically working the filled container in a manner to elongate the filled container and reduce cross-sectional area to densify the magnet particles to a consolidated elongated shape while impart a preferential grain texture. The consolidated elongated shape can be machined to provide a permanent magnet having a metallic tubular skin thereon, which can optionally be selectively removed from the magnet shape.

In an illustrative embodiment of the present invention, a powder-filled tubular container comprises a metallic material that is as deformable or more deformable at the hot rolling temperature as the magnet powder. The hot rolling is conducted in a manner to confine or limit lateral deformation of the magnet alloy powder as the tubular container is hot rolled. The metallic material of the tubular container can be selected from a suitable steel, copper, copper alloy, or other material to this end. Moreover, a hot rolling die or roller can be used having side walls stiff enough to this same end. Also, the tubular container can have a shape that is selected to limit undesired outward lateral container deformation during hot rolling.

Practice of embodiments of the present invention provide numerous advantages over the conventional sintering process including, but not limited to:

1. The present invention provides a continuous manufacturing process, while conventional sintering process is a batch process. The productivity will be dramatically improved and operating expenditures will be reduced.

2. Practice of embodiments of the present invention can be conducted in open ambient air, i.e. there is no need for the vacuum furnace. A simple induction coil may be enough to heat the metallic container. Such induction coil may heat the part more rapidly than the conventional furnace thereby reduce the magnet powders' exposure to the high temperature that leads to undesired grain growth. The capital expenditure thus will be lowered, allowing magnet manufacturers to readily adopt the technology.

3. Certain embodiments of the present invention use a steel tubular or other container, which results in a hot rolled steel skin on the magnet such that there is no need for nickel coating that the conventional sintered magnet needs for oxidization protection.

4. Practice of the present invention produces a permanent magnet that has a near-net-shape cross-section. Subsequent machining of the near-net shape magnet will be less than required for a sintered block.

5. Practice of the present invention produces substantially less waste of materials during sizing and machining.

6. Permanent magnets made pursuant to the present invention have consistent magnetic properties throughout the length of the hot rolled strip, while for the traditional sintered magnet, the core and shell of the block will have different properties due to the varying cooling rate. Thus, profit margin will be higher relative to the traditional sintering process.

7. Permanent magnets made pursuant to the present invention can be very thin, yet mechanically robust due to the retained hot rolled metallic skin.

8. Permanent magnets can be produced having a curved shape with a magnetization direction normal to the surface, all ideal for use as an arc magnet needed for certain electrical machines.

These and other features and advantages of the present invention will become more readily apparent from the following drawings and detailed description.

BRIEF DESCRIPTION OF THE DRAWINGS

FIG. 1 is a three-dimensional schematic of rolling a tubular container filled with nanocrystalline permanent magnet alloy powder.

FIG. 1A is a partial cross-sectional view of a hot rolled strip with substantially flat, upstanding sides.

FIG. 1B is a schematic a tubular container having concave shaped sides to confine or limit lateral deformation of the alloy powder during hot rolling.

FIG. 2 is a schematic view of a certain hot roll die method embodiment that applies a selected rolling pressure PR to achieve desired reduction percentage(s). The powder-filled copper tubular container C is loaded in die D (left hand view); densified by hot rolling at 600-700° C. (penultimate left-hand view) using roller R; and subjected to multiple passes to reduce cross sectional thickness at 700-750° C. (penultimate right hand view), and side elevational view (right-hand view).

FIGS. 5a-5c are line drawings (based on photos) showing the powder packed stainless steel tube sample in different processing steps. FIG. 5a is after filling and seal; FIG. 5b is after combination cold rolling; FIG. 5c is after hot rolling.

FIG. 6 comprises room temperature demagnetization curves of alloy powders and hot rolled samples (measured in the out of plane direction) processed with different rolling passes and tube wall thickness. The number before "X" represents the number of hot rolling passes, and the number before "mm" is the tube thickness.

FIG. 7a shows the room temperature demagnetization curves and FIG. 7b shows the X-ray diffraction patterns of the powders, hot rolled samples measured in out of plane (OutP) direction and rolling direction (RD).

DETAILED DESCRIPTION OF THE INVENTION

Figure 3:
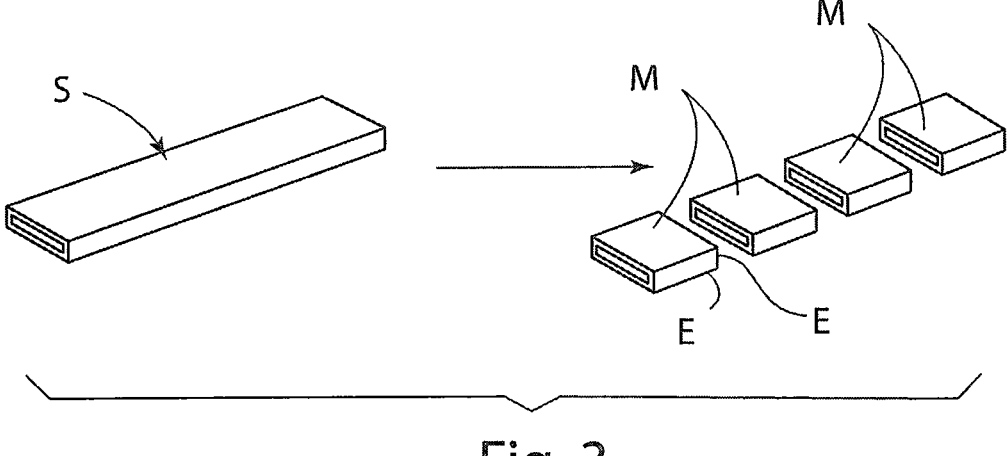
FIG. 3 shows the near-final shape hot-rolled strip with the metallic skin remaining and that can be cut into smaller magnet pieces as desired.

Embodiments of the present invention provide a method of making permanent magnets that overcomes the drawbacks of the above-described conventional batch processes by filling magnet feedstock magnet particles in a deformable (ductile) metallic container and thermomechanically working the filled container at elevated temperature in a manner to elongate the filled container and reduce cross-sectional area to consolidate the magnet alloy particles to a consolidated elongated shape and impart a preferential grain texture to the consolidated elongated shape. Thermomechanical working can be conducted by hot rolling, hot extrusion or other hot deformation technique that reduces the thickness dimension of the container and its powder contents. Hot rolling produces a strip shape with a rectangular or near-rectangular cross-section (e.g. having somewhat rounded side walls), while hot extrusion can produce a rod, wire, band, ring, or other shape of circular, oval, or other cross-section depending upon the shape of the opening of the extrusion die. The elongated shape then can be machined to provide a permanent magnet shape having a metallic tubular skin thereon, which can optionally be selectively removed, and which can be further machined to a desired near-net magnet shape.

Practice of embodiments of the present invention is particularly suitable for, although not limited to, production of a nano-grain magnet, with coercivity less sensitive to temperature than the conventional sintered magnet. Increased grain boundaries help to pin down magnetic domains, thereby retaining the coercivity at high temperature that can replace the need for the addition of heavy rare earth elements, such as Dy, for enabling the NdFeB magnet to function at high temperatures.

Certain embodiments of the present invention overcome drawbacks of the of the conventional batch processes by combining stress-assisted densification and hot deformation into a single hot working step. For purposes of illustration and not limitation, the magnet powders are packed and sealed into a stainless steel or other metallic container which can include, but is not limited, to tubular container, pouch container comprising metallic foil for example, or other shape container (also could be other metals that are more cost effective) and then rolled with substantially large reduction in cross-sectional area at a targeted deformation temperature. For example, the powder-filled tube or pouch container can be hot deformed with at least 50%, preferably at least 75%, or more aggregate 90% reduction in thickness (or other dimension) at a targeted hot deformation temperature usually achieved as an aggregate reduction in thickness by using multiple rolling passes. The metallic container serves as an enclosure and pressure transferring medium for densification and grain texture development, thereby eliminating the need for an expensive mold for hot pressing, and enables the continuous production of consolidated and elongated magnet with both small and large cross-sections, while reducing any significant drop in coercivity due to grain growth caused by the prolonged exposure to high temperature associated with the batch hot pressing and subsequent deformation.

Hot deformation embodiments of the present invention can overcome this deleterious grain growth problem by allowing for rapid cooling of the samples due to their smaller thermal mass with no need to be separate from a hot-pressing die, and direct contact with the relatively cold (room temperature) rollers. Because of the metallic tube protection, the heating of the materials could be conducted by a simple induction coil, allowing rapid temperature ramping in just a few second instead of waiting the whole tube to heat up in a furnace. Lastly, the hot deformation process is carried out in ambient air such that there is no need for an expensive vacuum furnace. However, the process can also be performed in inert environment, if needed.

In an illustrative method embodiment of the present invention, a powder-filled tubular container comprises a steel or other metallic material that is as deformable or more deformable at the hot rolling temperature as the magnet powder. The compressive strength of the tubular container is selected to be comparable or slightly higher than that of the magnet powder so that the container can hold the powder in place and deform it along the direction of the container deformation and depends upon the materials to be hot worked. The tubular container should be easily deformed at the selected hot working temperature so that the container forces the magnet powder to deform. A typical ductility of the tubular container can be high, such as at least 50% elongation, preferably 100% elongation, for a typical hot working temperature of 700-750° C. or above, thereby allowing a short tubular container and magnet powder contents to be hot-rolled into a relatively long strip. The stated ductility and working temperature values are for the purpose of illustration, rather than limitation. Multiple hot rolling passes typically are employed to this end with a stress relieving treatment at low temperature of about 200-400° C. followed by air cooling. Such a low temperature stress relief temperature is low enough not to adversely affect the magnet powder.

The thermomechanical working preferably is conducted in a manner to confine or limit outward lateral (side) deformation of the magnet powder as the container is hot deformed. The metallic material of the container can be selected from a suitable steel or other material to this end. Moreover, a hot rolling die can be used having upstanding side walls W, FIG. 2, stiff enough to this same end. Also, the tubular container can have a selected concave-side shape that is selected to limit undesired outward lateral container deformation during hot rolling, FIG. 1B. For example, the tubular container C' of FIG. 1B having concave sides can be used to this end.

The following Examples are offered to further illustrate, but not limit, practice of the present invention:

Example 1

The following illustrative embodiments of the invention involve a hot-rolling process in which a ductile metallic tubular container is filled with NdFeB (Neo) nanocrystalline powder (grain size typically in the range of 10 to 1000 nm diameter) and is deformed into the near-net-shape magnet part at a high temperature. For purposes of illustration and not limitation, the nanocrystalline Neo feedstock powder can be commercial grade MQU-F powder by MagneQuench having an initial grain size of about 20 to 30 nm. The method begins with packing nanocrystalline powders P prepared by rapid solidification processing such as melt-spinning/pulverization method, or by HDDR (Hydrogenation Disproportionation Desorption Recombination) method, densely into a thin wall, ductile metallic tubular container C. The dimensions of the tubular container as well as the sizes of the roller, roller/U-shaped die or dual opposing rollers, FIGS. 2 and 3, are determined by the size of the near-net-shape Neo magnet shape desired. The ductile tubular container serves as a deformable die and preferably comprises a metallic material that is ductile and can be hot deformed to over 500% strain deformation. In this Example, the ductile tubular container comprises copper metal or copper alloy sleeted from one of brass, bronze, and a copper-rare earth element alloy (e.g. Cu—Pr alloy) having a wall thickness in the range of 0.1-5 mm, although the next Example 2 employs a stainless steel tubular container.

Figure 4:
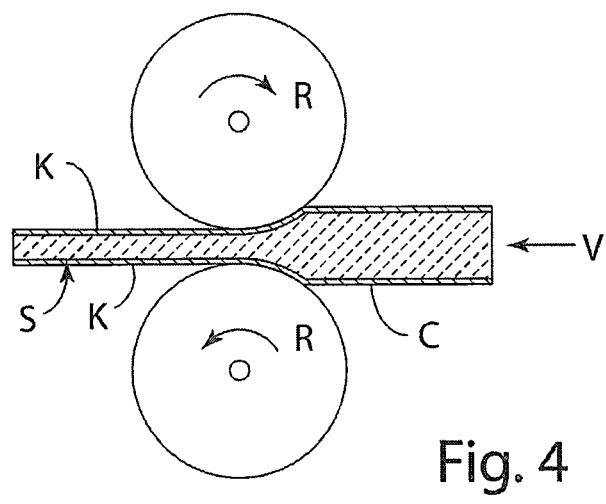
FIG. 4 is a side view of a twin opposing roller apparatus for hot rolling a long powder-filled tubular container on an industrial scale to an over-sized precursor magnet length of tens of meters, if desired.

As shown in FIGS. 1-2, a single roller R or alternately a single roller R and U-shaped die D can be used to effect the hot rolling. Alternately, an opposing twin roller assembly, FIG. 4, can be used to this same end. The single roller, roller/U-shaped die or opposing twin rollers R typically are kept at room temperature or heated to an elevated temperature similar to that of the filled tubular container for hot rolling.

A tubular container is typically filled with the powder under non-reactive gas then sealed by e-beam or other welding methods under vacuum. The sealed tubular container typically is hot-rolled at a temperature of 660-750° C. or more in the Cu alloy tubular container in one or more passes to elongate the container and reduce its cross-sectional area in a manner to consolidate or compact the Neo nanocrystalline powder inside to near full green density (e.g. greater than 97% density of theoretical). For purposes of illustration and not limitation, a temperature of 600-700° C. can be used to densify the Neo powder-filled tubular container. A high green density at this step is critical for developing the texture (preferred crystallographic grain orientation) in the following hot rolling step. Otherwise, the powders may fill into the voids present and/or flow along rolling (elongating) direction, instead of being deformed and aligned along their tetragonal basal plane. Then, the tubular container filled with dense powder is further hot-rolled into a fully dense and highly textured strip. This last hot rolling step is conducted for texture formation wherein the easy magnetization c-axis of grains is preferentially oriented as described herein. For purposes of illustration and not limitation, this grain texture-hot rolling step is conducted at a temperature of 750° C. more or less for Neo powder in the Cu alloy container, where average grain size is controlled for example to be about several tens to hundreds nanometer. For purposes of illustration and not limitation, a total reduction in cross-sectional area of the filled tubular container of 50% or more, such as 75% (e.g. from 8 mm thickness to 2 mm strip thickness), can be used. However, the starting thickness of the precursor strip typically is selected so that at least a 75% reduction can be achieved by hot rolling so as to impart desired grain texture to the strip. For purposes of illustration and not limitation, a final strip thickness can be from 1 mm or less to 20 mm or more depending upon the service application. Finally, the obtained strip is annealed in conventional manner to encourage more preferential grain growth.

The cross-section of the hot-rolled anisotropic magnet strip. S has a cross-sectional shape of a pancake with rounded sides, FIG. 1, or upstanding straighter sides FIG. 1A (produced using die with upstanding stiff side walls W shown that limit lateral deformation of the alloy powder).

The hot rolled consolidated powder particles P are encased in the hot rolled skin K. The cross-section can also be rolled into an arch or other curvilinear shape when a die with the corresponding shape is used. The hot rolled elongated strip cross section can be designed to be near-net-shape, so that minimum machining such as cutting is needed for sizing to a near-final magnet dimension such as a smaller length dimension of the magnet. After the process, the tubular container remains and forms a thin exterior metallic tubular shell or skin K protecting the inner consolidated magnet strip from oxidization or any fracturing during machining, assembly, and service. This shell or skin can also act as structural support for the magnet and directly attach to the machine structure such as the rotor in a motor. It reduces the distance between the magnet and the electromagnet pole thereby increases the magnetostatic force which is sensitive to distance.

After cutting or other machining, the resulting multiple magnets M, FIG. 3, have only two cut sides or ends E that are exposed to air such that only these small open cut sides or ends oxidize a small fraction of the magnet strip and stop further oxidation. As a result, it is possible to skip or simplify the conventional nickel protective coating process.

The shear deformation during the hot-rolling process forces the nanocrystalline grains to grow along the basal plane of its tetragonal lattice, leaving the c-axis aligned along the roller compression direction of the anisotropic magnet. That is, the easy magnetization c-axis of the Neo strip is substantially perpendicular (normal) to the major strip surface.

If copper or copper alloy is used in the tube (container) materials, the diffusion of copper or a copper alloy constituent, such as the rare earth Pr, into the grain boundary during and/or after hot rolling may further enhance coercivity.

An important advantage of practice of these illustrative embodiments of the present invention over existing die-upsetting and backward extrusion processing is that practice of the invention allows semi-continuous processing, while the existing processes are one-part-at-a time. Practice of the present invention is advantageous in that it is much faster and cheaper. And, a powder-filled tubular container that is a meter or more in length can be used to directly produce a rolled precursor strip magnet that is tens of meter in length or longer. This long precursor magnet strip is then cut or otherwise machined into smaller lengths of final magnets M, FIG. 3. As long as the cross section is near net shape, the strip-cutting will be the last step needed for sizing to a final magnet length.

Example 2

Raw Nd—Fe—B flakes (MQU-F) used in this Example were acquired from MagneQuench Company. This commercial powder is available in the form of melt spun flakes. The flakes were ground using mortar and pestle to ≤355 μm under Ar protection. Then the powders were packed into stainless steel tube (Type 316 container) with an outside diameter of 12.7 mm and wall thickness of 0.5 mm or 1.6 mm. The two ends of the tube were welded shut in Ar atmosphere using a TIG welder. The tube was not vacuumed before welded shut.

The powder packed tube (circular cross-section container) was first cold rolled/shaped into a square tube with about 66% reduction using combination rollers (Ultra series powder mill, Pepetools, USA). Then the powder-packed square tube was heated to 800° C. using a preheated laboratory box furnace. After preset dwell time, the tube was pulled out from the furnace and rolled through the opposing flat-surface rollers made of steel kept at room temperature. Multiple rolling passes were applied to achieve the desired reduction of 65% in thickness). The sample was reheated at 800° C. before each rolling. The dwell time was 5 minutes for the first heat and 2 minutes for the reheats.

The density of the hot rolled sample was measured by Archimedes method. The magnetic properties of the sample were measured by Vibrating Sample Magnetometer (VSM, PPMS, Quantum Design Inc) in up to 9 Tesla field. The obtained Nd—Fe—B specimens ($3 \times 3 \times 2$ mm³) were cut from the hot rolled strip, and the magnetic hysteresis loops were measured normal to the rolling plane and along the rolling direction. The demagnetization factor was corrected for all the magnetic measurements. The texture of the samples was measured using an X-ray diffractometer (PANalytical X'Pert) equipped with a Cu target. For the heat treatment study, the feedstock powders were sealed in quartz tubes filled with Ar and heat treated from 740° C. to 840° C. and from 2 min to 30 min, followed by water quench.

FIG. 5a is a line drawing of a powder packed stainless steel tube before processing. FIG. 5b is a similar drawing after it is processed with combination cold rolling, while FIG. 5c is a similar drawing after it is hot rolled. The initially round tube was formed into a square tube after the combination rolling. This optional step serves to increase the green body density, which helps with densification when the powder sample is heated and hot rolled. The strain hardened edges of the square tube act as relatively stiff boundary conditions to allow for more efficient stress application on the sample by confining or limiting undesired lateral deformation of the stainless steel tube and its powder contents in a direction normal to the applied compression pressure. The density of the powder sample after the combination rolling was 4.7 g/cc which is typical of that of a cold-pressed sample. After hot rolling, the stainless steel tube was deformed to a strip (FIG. 5c). The total thickness reduction of the powder compact was ~65%. Nd—Fe—B plates with a thickness of 2-3 mm can be obtained by peeling off the stainless steel layer on the hot rolled sample. Optionally, a thin stainless steel layer can be kept as magnet oxidation protection layer.

The room temperature demagnetization curves (FIG. 6) of the hot rolled sample show a significant increase (at least 2×) in the maximum energy product $(BH)_{max}$ of the bulk sample after the hot rolling process. The as-received powder has a $(BH)_{max}$ of 11.3 MGOe as it is isotropic. After the hot rolling, although there is some reduction of the coercivity $(H_{cj})$, the remanence $(B_r)$ and squareness of the curve is significantly improved leading to increased energy product. The sample having the highest $(BH)_{max}$ was rolled for 4 times at 800° C. using a thin stainless steel tube skin (0.5 mm or 1.6 mm thickness), where the $(BH)_{max}$, $H_{cj}$, and $B_r$ is 31.6 MGOe, 10.9 kOe, and 12.2 kGs, respectively. FIG. 6 shows how the number of rolling passes can affect the magnetic properties: the $H_{cj}$ is reduced while the $B_r$ is increased when the rolling pass is increased from 3 times to 4 times. Increasing the rolling passes increases the powder deformation responsible for texture formation, but it inevitably increases the sample's thermal exposure, resulting in grain growth. Four rolling passes at 800° C. with 30% reduction each pass was found to be an optimum condition for this tube sample. Here, the 30% reduction refers to the gap between the rollers set before the hot-roll process. Due to elastic deformation, the actual plastic deformation is less than 30% per pass. After the four passes, the total actual thickness reduction is about 65%. FIG. 6 also showed a minor impact from the tube thickness. The stainless steel tubular container with thinner wall appears to contribute to better densification of the sample leading to improved saturation $M_s$ and higher $B_r$.

Figure 7A:
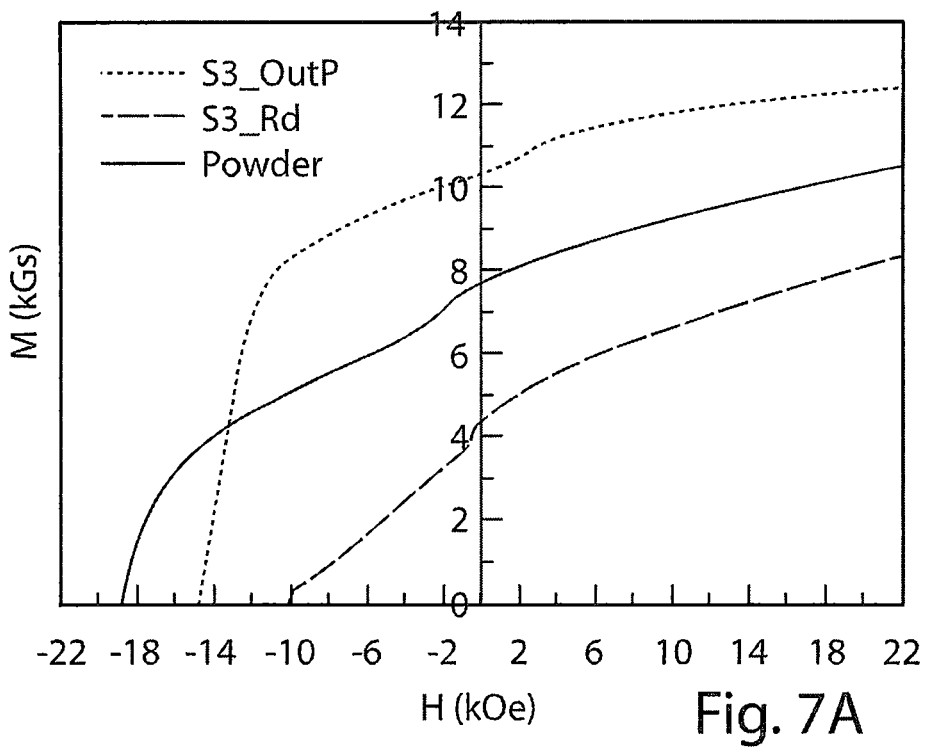
FIGS. 7a, 7b show results of analyses showing the hot rolled magnetic strip is anisotropic: where
Figure 7B:
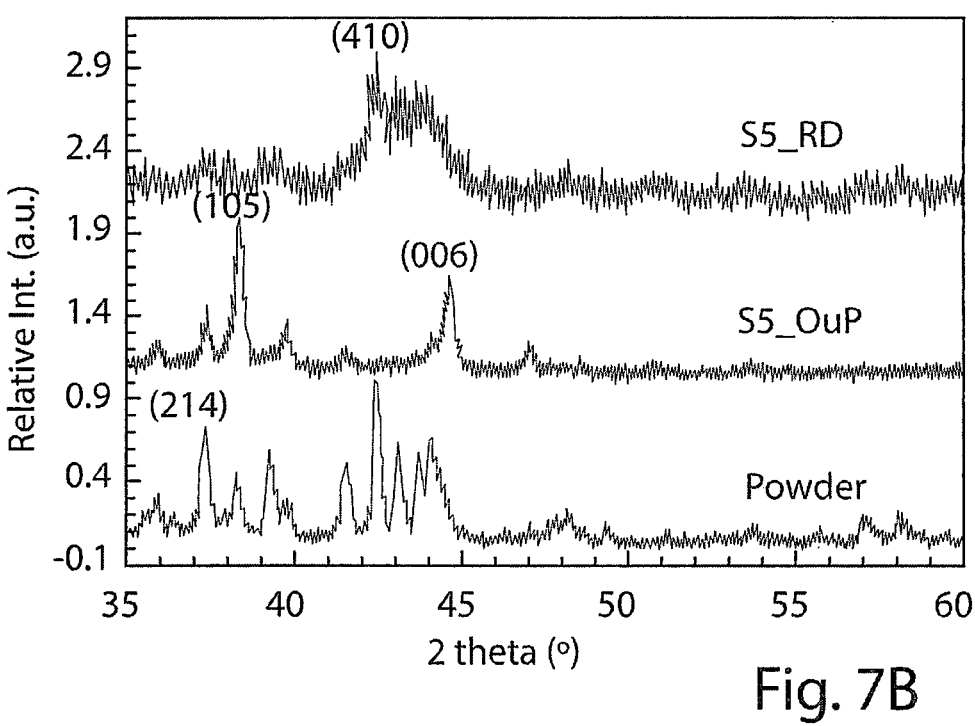

To characterize the texture of the hot rolled sample, VSM (Vibrating Sample Magnetometer) and XRD (X-ray diffraction) measurements were conducted in a sample cut along the out-of-plane (OutP) direction and along the rolling direction (Rd) (FIG. 7a, 7b). FIG. 7a shows that the $B_r$ and squareness increased along the OutP direction and decreased along the Rd direction compared to the powder sample. It shows that the magnetic easy axis is oriented out of the plane. $Nd_2Fe_{14}B$ has a tetragonal crystal structure (tP68), with its c axis being its magnetic easy axis. It has been shown that severe deformation of the $Nd_2Fe_{14}B$ grain can result in preferred orientation of the crystals aligning its c axis with the stress direction. The maximum normal stress direction is perpendicular to the strip plane in the hot rolling process, defining the direction where the c-axis likely to align. The total thickness reduction of the $Nd_2Fe_{14}B$ sample is ~65%, significant enough to form grain texture at 800° C. When measured in the OutP direction, the relative intensity of the plane parallel to the c axis is strongly increased compared to powder pattern (FIG. 7b). And when measured along the in-plane direction, there is an increase in relative intensities of the basal plane (410). Such relative intensity changes in the XRD patterns suggest a highly textured sample with c-axis aligned OutP, which is consistent with the VSM results.

Figure 8:
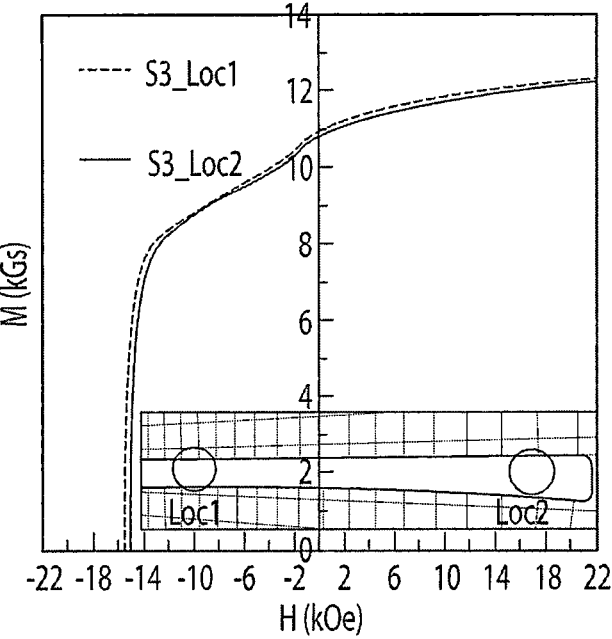
FIG. 8 comprises demagnetization curves showing the consistency of performance along the length of the hot rolled sample. The inset image shows the sampling locations.

The hot rolling process can apply consistent stress over a significant length, which can lead to consistent properties across the sample length. This is validated by cutting two specimens from the two ends of the hot rolled samples and measuring their magnetic properties. FIG. 8 shows that the two specimens harvested from two remote locations have nearly identical magnetic properties with nearly the same $H_{cj}$, and $B_r$.

The observed drop in coercivity in the hot rolled sample may be related to the thermally activated grain growth wherein either an increase in temperature or dwell time decreases coercivity. The $H_{cj}$ of the feedstock powder is 19.28 KOe. Heat treatment below 800° C. results in only a minor change in $H_{cj}$. For example, the $H_{cj}$ remains high (16.55 Koe) even after 30 minutes at 740° C. When the heat treatment temperature is ≥800° C., the $H_{cj}$ drops rapidly with time. At 800° C., the $H_{cj}$ drops to 16.7 KOe after 5 minutes, 13.72 KOe after 10 minutes, and 11.67 KOe after 15 minutes. The $H_{cj}$ quickly drops below 10 KOe when rolled at 820° C. with exposure above 15 minutes.

In Example 2, 800° C. was chosen as a preferred choice for hot rolling temperature, taking into account that a higher temperature is needed for sufficient densification and texture formation. The dwell time for the hot rolling should be minimized when hot rolled at 800° C. A five-minute dwell time was selected in the first heat allows for uniform heating of the sample. The dwell time was reduced to two minutes for the subsequent heat before rolling. The dwell time can be further reduced if a continuous process using more efficient heating is implemented. FIG. 6 shows a Hcj of 15.4 KOe, and 10.9 KOe, after three hot roll passes and four hot roll passes, respectively. The total dwell time for three hot roll passes and four hot roll passes are 9 min and 11 min, respectively.

Example 2 illustrates that hot rolling method for near-net-shape fabrication of small high-performance anisotropic Nd—Fe—B magnet is advantageous. Compared to Nd—Fe-B's currently available processing route, the hot rolling method can reduce cost and part failure rate while improving consistency. For example, the Nd—Fe—B powders were loaded into the stainless steel tube and directly processed into the final shape by hot rolling. A nearly full dense bulk magnet with a $(BH)_m$ax of 31.6 MGOe was demonstrated using the commercial MQU-F Nd—Fe—B powders with theoretical a $(BH)_m$ax of 37 MGOe. The hot rolled bulk magnet had a strong c-axis out of plane grain texture, which is responsible for the relatively high $(BH)_m$ax. Heat treatment studies of the as received powder showed the $H_{cj}$ is sensitive to both the temperature and time of the thermal exposure. The $H_{cj}$ was reduced by half after the hot rolling process, presumably due to the relatively long thermal exposure limited by the heating rate capability of furnace. Large-scale manufacturing processes with a rapid heating option can address this unnecessary extended thermal exposure and enable cost effective magnet production with higher $(BH)_{max}$.

Although the present invention has been described with respect to certain illustrative embodiments, those skilled in the art will appreciate that changes and modification can be made thereto within the scope of the present invention as defined in the appended claims

REFERENCES, WHICH ARE INCORPORATED
HEREIN BY REFERENCE

[1] https://www.arnoldmagnetics.com/products/neodymium-iron-boron-maqnets/
[2] Horton, J. A., J. L. Wright, and J. W. Herchenroeder. "Fracture toughness of commercial magnets." *IEEE Transactions on Magnetics* 32.5 (1996): 4374-4376.
[3] Li, Wei, Anhua Li, and Huijie Wang. "Anisotropic fracture behavior of sintered rare-earth permanent magnets." *IEEE transactions on magnetics* 41.8 (2005): 2339-2342.
[4] https://www.corning.com/microsites/csm/gorillaglass/PI_Sheets/CGG_PI_Sheet_Gorilla%20Glass%203.pdf
[5] Li, W. F., et al. "The origin of coercivity decrease in fine grained Nd—Fe—B sintered magnets." Journal of Magnetism and Magnetic Materials 321.8 (2009): 1100-1105.
[6] Sepehri-Amin, H., et al. "Microstructure of fine-grained Nd—Fe—B sintered magnets with high coercivity." Scripta Materialia 65.5 (2011): 396-399.
[7] Liu, J. F., et al. "Microstructure and magnetic properties of sintered NdFeB magnets with improved impact toughness." Journal of applied physics 97.10 (2005): 10H101.
[8] Cui, Jun, and Baozhi Cui. "Feedstock and heterogeneous structure for tough rare earth permanent magnets and production process therefor." U.S. patent application Ser. No. 16/350,196.
[9] https://mqitechnology.com/products/bonded-neo-powder/
[10] Knoch, K. et al. "$Nd_2Fe_{14}B$—Its Region of Primary Solidification." Z. Metallkd. 85.5 (1994): 350-353.
[11] Croat, John J. "Current status of rapidly solidified Nd—Fe—B permanent magnets." IEEE Transactions on Magnetics 25.5 (1989): 3550-3554.
[12] Grünberger, W., et al. "Hot deformation of nanocrystalline Nd—Fe—B alloys." Journal of Alloys and Compounds 257.1-2 (1997): 293-301.

We claim:

1. A method for fabrication of an anisotropic magnet shape, comprising filling magnet alloy feedstock particles having a grain size of 10 to 1000 nm in a metallic container and subjecting the particle filled container to more than three successive hot rolling passes wherein the particle filled container is heated between each succeeding hot rolling pass to a hot rolling temperature and hot rolled in contact with at least one roller that is at a lower temperature than the hot rolling temperature to achieve a partial reduction in thickness by each hot rolling pass of the heated particle filled container with roller-contact-cooling thereof before each next hot rolling pass, wherein the hot rolling passes, in aggregate, elongate the particle filled container and reduce its cross-sectional area to consolidate the magnet alloy particles to a consolidated elongated precursor magnet strip shape and impart a preferential grain texture thereto having an easy-magnetization axis in a direction normal to a major planar surface of the strip shape along its length with a metallic skin comprising hot rolled container metallic material thereon; wherein the more than three successive hot rolling passes increase magnet remanence and reduce magnet coercivity while the preferential grain texture developed by the hot rolling passes produces increased magnet energy product $(BH)_{max}$ compared to the magnet alloy feedstock particles; and machining the consolidated elongated precursor magnet strip shape to provide a near net-shaped magnet having the metallic skin thereon.

2. The method in claim 1 that forms the precursor magnet strip shape with rectangular or near rectangular cross-section.

3. The method of claim 2 wherein the precursor magnet strip shape has a strip length that is machined into smaller monolithic magnet strip lengths.

4. The method of claim 3 wherein the precursor magnet strip shape is produced having a length that is 10 centimeters or more in length.

5. The method of claim 1 wherein an easy magnetization c-axis of the precursor magnet strip shape is oriented normal to the major planar surface of the strip shape.

6. The method of claim 1 wherein the consolidated elongated precursor magnet strip shape has a density of at least 97% of theoretical density excluding container material.

7. The method of claim 1 wherein the feedstock particles comprise at least one of RE-TM, RE-TM-B, RE-TM-N, TM-N, or Mn—(Bi, Al, Ga), where RE is a rare earth element including at least one of Y, La, Ce, Nd, Pr, Sm, Gd, Tb, or Dy; and TM is a transition metal including at least one of Ti, V, Cr, Mn, Fe, Co, Ni, Cu, Zn, Zr, Nb, or Mo.

8. The method of claim 1 wherein the metallic container comprises a metallic material which metallic material can be hot rolled in successive hot rolling passes to the strip shape.

9. The method of claim 1 wherein the metallic container comprises at least one of steel, copper metal, copper alloy, iron alloy, or nickel alloy.

10. The method of claim 9 wherein the steel comprises stainless steel.

11. The method of claim 9 wherein the container comprises a copper-rare earth element alloy.

12. The method of claim 11 including diffusing the copper-rare earth element alloy into the precursor magnet strip shape to enhance a magnet property.

13. The method of claim 12 wherein the copper-rare earth element alloy is diffused to grain boundaries of the precursor magnet strip shape during and/or after the hot rolling passes.

14. The method of claim 1 wherein the feedstock particles are placed in the metallic container under a vacuum or non-reactive gas and the container is then sealed and followed by induction heating of the particle filled container before each hot rolling pass in ambient air.

15. The method of claim 1 wherein the container is a tubular container or a pouch container.

16. The method of claim 1 wherein the particle filled container is subjected to the hot rolling passes each being conducted between opposing rollers.

17. A method for fabrication of an anisotropic magnet shape, comprising filling magnet alloy feedstock particles having a grain size of 20 to 30 nm in a metallic container and subjecting the particle filled container to successive hot rolling passes wherein the particle filled container is induction heated to a hot rolling temperature between each succeeding hot rolling pass and hot rolled in contact with at least one relatively cold roller that is at room temperature to achieve a partial reduction in thickness less than 30% by each hot rolling pass of the particle filled container with roller-contact-cooling thereof before a next hot rolling pass, wherein the hot rolling passes, in aggregate, elongate the particle filled container and reduce its cross-sectional area to consolidate the magnet alloy particles to a consolidated elongated precursor magnet strip shape having a preferential c-axis grain texture imparted thereto in a direction normal to a major planar surface of the strip shape along its length and with a metallic skin comprising hot rolled container metallic material present thereon; wherein more than three successive hot rolling passes of the particle filled container increase magnetic remanence and reduce magnetic coercivity while the preferential c-axis grain texture developed by the hot rolling passes produces increased magnet energy product $(BH)_{max}$ compared to the magnet alloy feedstock particles; and machining the consolidated elongated precursor magnet strip shape to provide a near net-shaped magnet having an energy product $(BH)_{max}$ above 30 MGOe measured at room temperature.

18. The method of claim 17 wherein the particle filled container is subjected to successive hot rolling passes each conducted between opposing rollers.

19. A method for fabrication of an anisotropic magnet shape, comprising filling magnet alloy feedstock particles having a grain size of 10 to 1000 nm in a metallic container and subjecting the particle filled container to successive hot rolling passes wherein the particle filled container is heated between each succeeding hot rolling pass to a hot rolling temperature and hot rolled in contact with at least one roller that is at a lower temperature than the hot rolling temperature to achieve a partial reduction in thickness by each hot rolling pass of the heated particle filled container with roller-contact-cooling thereof before each next hot rolling pass, wherein the hot rolling passes, in aggregate, elongate the particle filled container and reduce its cross-sectional area to consolidate the magnet alloy particles to a consolidated elongated precursor magnet strip shape and impart a preferential grain texture thereto having an easy-magnetization axis in a direction normal to a major planar surface of the strip shape along its length with a metallic skin comprising hot rolled container metallic material present thereon; and machining the consolidated elongated precursor magnet strip shape to provide a near net-shaped magnet having the metallic skin present thereon.

*    *    *    *    *